March 23, 1954     A. V. PEDERSEN     2,672,658
WOOD JOINT
Filed Oct. 31, 1949                           2 Sheets-Sheet 1
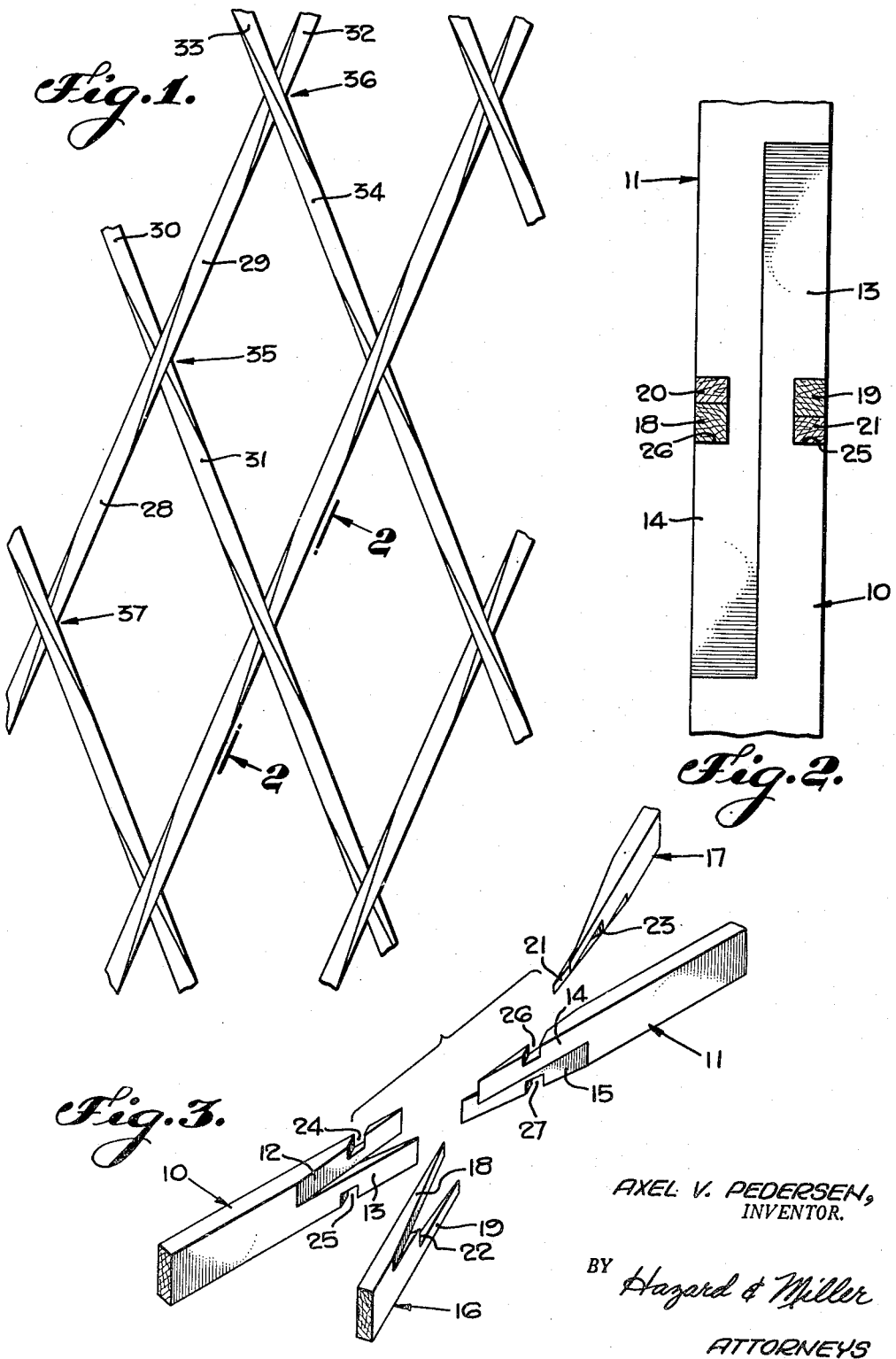
AXEL V. PEDERSEN,
INVENTOR.
BY Hazard & Miller
ATTORNEYS March 23, 1954  A. V. PEDERSEN  2,672,658
WOOD JOINT Filed Oct. 31, 1949  2 Sheets-Sheet 2

AXEL V. PEDERSEN,
INVENTOR.

BY Hazard & Miller
ATTORNEYS

Patented Mar. 23, 1954

2,672,658

UNITED STATES PATENT OFFICE 2,672,658

WOOD JOINT

Axel V. Pedersen, Los Angeles, Calif.

Application October 31, 1949, Serial No. 124,706

9 Claims. (Cl. 20—92)

This invention relates to improvements in wood joints. An object of the invention is to provide a wood joint consisting essentially of two pairs of members such as boards or the equivalent, each pair having its members arranged in end to end relationship and provided at its ends with oppositely scarfed tongues which, when the members are in assembled relationship, engage the opposed tongues of the other member. The pairs of members are arranged at an angle to each other and the mutually engaged tongues of the members of each pair extend across the mutually engaged tongues of the members of the other pair in such a manner that one pair of members serves to effectively lock the members of the other pair against separation. By having the scarfs on the tongues of proper slope not exceeding ordinarily 1 to 6, the joint formed between the members of each pair is such that it is capable of transmitting bending stresses even in the absence of glue or other fastening means. Consequently the improved joint may be used without glue or fasteners or, if glue is employed between the joints, the parts may be assembled quickly while the glue is still in an unset condition and is capable of transmitting bending and compression stresses while the required time elapses for the glue to set. In this manner, various structures may be easily and quickly erected and will be at least self-supporting prior to the time that the glue used in the joints has set.

The improved wood joint is advantageously used in the erection of "lamella" type roofs, floor supports and other grid-like structures.

With the foregoing and other objects in view, which will be made manifest in the following detailed description and specifically pointed out in the appended claims, reference is had to the accompanying drawings for an illustrative embodiment of the invention, wherein:

Figure 1 is a plan view of a portion of a diamond-shaped grid work made up of wood members joined together by means of the improved wood joint;

Fig. 2 is a sectional view taken substantially upon the line 2—2 upon Fig. 1 in the direction indicated;

Fig. 3 is an exploded view of the wood joint embodying the present invention;

Figure 4:
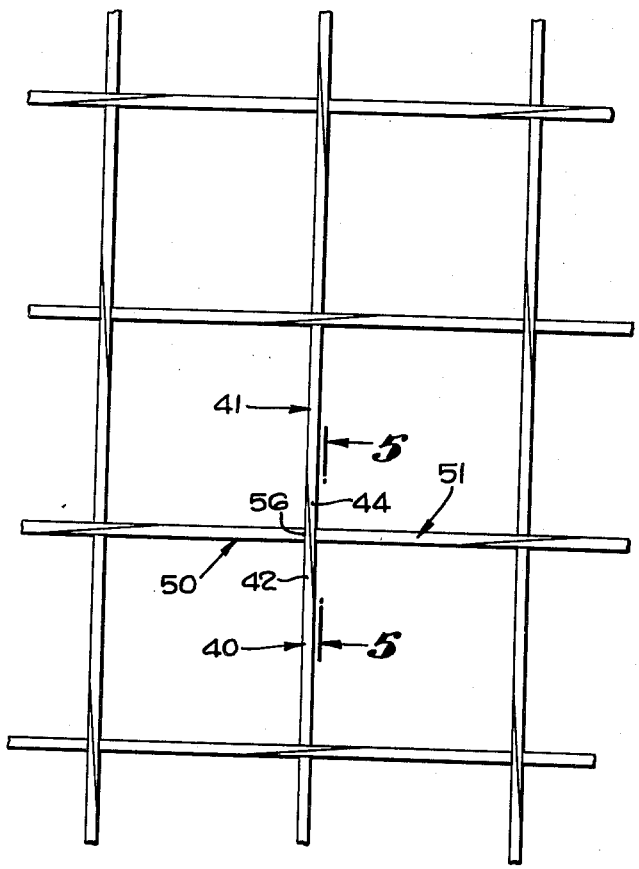
Fig. 4 is a partial plan view of a rectangular grid work made up of wood members that are joined by means of wood joints embodying the present invention.

Referring to the accompanying drawings wherein similar reference characters designate similar parts throughout and referring first to the form of joint illustrated in Figs. 1 to 3, inclusive, the improved joint consists of a first pair of members or boards, indicated at 10 and 11, arranged in alignment or substantially so or, in other words, in end to end relationship. Each of these members has oppositely scarfed tongues formed thereon at its ends, the tongues on the member 10 being indicated at 12 and 13 and the tongues on the member 11 being indicated at 14 and 15. These tongues are contiguously arranged in side by side relationship and are oppositely scarfed. Thus, as viewed from the center of the member 10 the tongue 12 may be regarded as scarfed toward the left and the tongue 13 regarded as scarfed toward the right. In a similar manner, viewing the tongues 14 and 15 from the center of the member 11 the tongue 14 may be regarded as having been scarfed to the left and the tongue 15 as scarfed to the right. The slope of the scarfs should be substantially less than 1 to 1 and while it may be as low as 1 to 10, or even 1 to 12, for practical purposes a slope of approximately 1 to 6 is preferred. When the scarfs have such a slope, on assembling the two members 10 and 11 together it will be found that the joint between these two members is such as to be capable of transmitting bending as well as compression stresses even in the entire absence of glue or other fastening means. A second pair of members completes the joint, these members being indicated at 16 and 17, respectively. On the ends of these members there are also oppositely scarfed tongues, the tongues on the member 16 being indicated at 18 and 19, and the tongues on the member 17 being indicated at 20 and 21. These tongues, instead of being contiguously arranged as in the case of the tongues 12 and 13 or 14 and 15, are spaced from each other and between the tongues there is an abutting surface, the abutting surface on the member 16 being indicated at 22 and that on the member 17 being indicated at 23. Notches 24, 25, 26 and 27 are formed in the outer side edges of the tongues 12, 13, 14 and 15, respectively. The widths of these notches are equal to the thicknesses of the members 16 and 17 or, expressed in another manner, they are equal to the combined thicknesses of the tongues 18 and 20 and 19 and 21 when these tongues are in assembled relationship.

The improved wood joint is of advantageous use in the construction of wooden grid work and if the joint is constructed as illustrated in Fig. 3 the members, when assembled, will produce a diamond-shaped grid work as illustrated in Fig. 1 of the type used in the construction of lamella-type roofs. It may also be used for other purposes.

In assembling the joint the members 10 and 11 of the first pair of members are brought together to cause their scarfed tongues to mutually engage. Glue may be applied to the tongues depending upon whether or not the joint is to be a glue joint in its final form. When the members 10 and 11 are assembled, notch 24 will align itself with notch 26 and in a similar manner notch 25 will be aligned with notch 27. The members 16 and 17 may then be brought together so that their scarfed tongues will mutually engage. In bringing these members together the tongues 18 and 20 will be passed through the aligned notches 24 and 26, and the tongues 19 and 21 will be passed through the aligned notches 25 and 27. The abutting surfaces 22 and 23 are so arranged that they will engage or abut against the sides of the joint formed by the tongues on the members 10 and 11 when the tongues on the members 16 and 17 are in mutual engagement. The tongues on the members 16 and 17 may likewise have glue applied thereto prior to assembly depending on whether the final joint is to be a glued joint or not.

It will be noted that when the members 16 and 17 are brought together, as above explained, as the tongues thereon extend through the aligned notches in the tongues on members 10 and 11, the members of the second pair in effect form a lock which will prevent separation of the members 10 and 11 as long as members 16 and 17 are in position. Members 16 and 17 can, of course, be separated if they are not glued to each other and after these have been separated members 10 and and 11 can separate if they have not been glued. By reason of this locking of the members 10 and 11 in assembled relationship by the members 16 and 17, it is advisable in many instances in the construction of a grid work as illustrated in Fig. 1 to arrange the joints in the manner illustrated. Thus, on Figure 1, members 28 and 29 may correspond to members 16 and 17, respectively, and serve to lock the joint between members 30 and 31 against separation, it being understood that members 30 and 31 correspond to the first pair of members 10 and 11. The adjoining joints, however, are oriented from that position so that the joint between members 29 and 32 is of the type between the members 10 and 11 and the joint between members 33 and 34 is of the type between members 16 and 17. By arranging the joints in this manner, although members 28 and 29 are not locked against separation at the joint 35, they are locked against longitudinal movement at the joints 36 and 37. Consequently, although at any crossing of the grid work only two members will be locked against separation at the crossing by the other two members, the other two members or unlocked members are locked against longitudinal movement at adjacent crossings. When such an arrangement of joints is adopted it will be understood that the end of the member 10, not shown in Fig. 3, will be shaped in a manner corresponding to the end of member 16 as illustrated and in a similar manner the end of member 11, not shown in Fig. 3, will be shaped in a manner corresponding to the illustrated end of member 17. It is, of course, not essential in the use of the improved wood joint that adjoining or adjacent crossings of the grid work have the joints oriented from each other but when this arrangement is adopted the advantages of the improved wood joint are utilized to a high degree. It is of course possible to erect suitable grid work wherein the members at all crossings which extend in one direction will be locked and the members extending in the other direction will all be unlocked. Where the locking arrangement is adopted it is necessary to commence the erection of the grid work adjacent one corner and gradually progress toward the other, effecting the locking by the assembly of the members as the erection proceeds.

Figure 5:
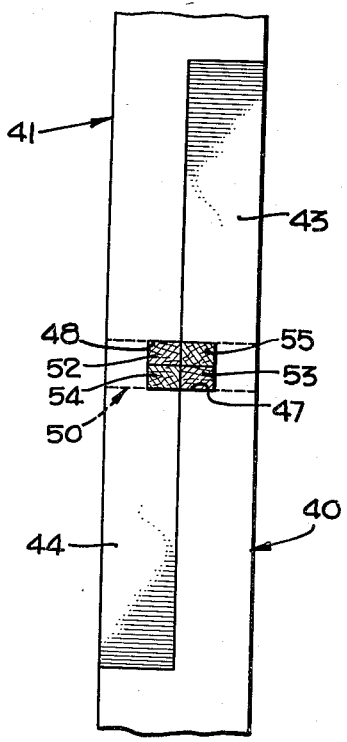
Fig. 5 is a sectional view taken substantially upon the line 5—5 upon Fig. 4.
Figure 6:
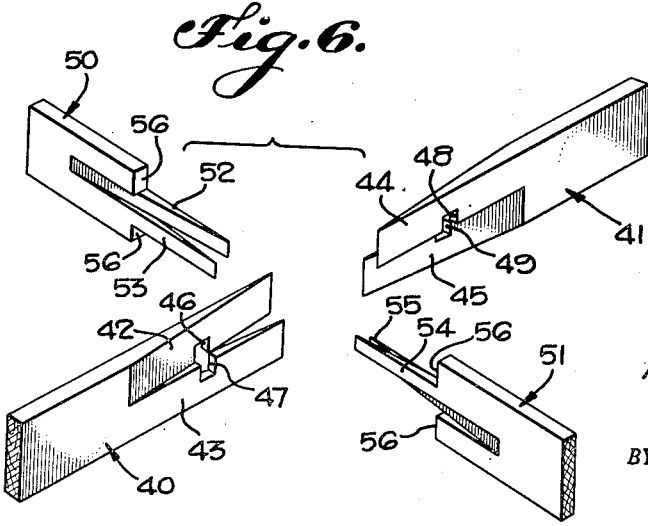
Fig. 6 is an exploded view of the wood joint employed in the structure illustrated in Fig. 4.

In Figs. 4 to 6, inclusive, a similar arrangement is disclosed wherein there are members 40 and 41 of the first pair having oppositely scarfed tongues 42, 43, 44 and 45, respectively. The tongues on these members, instead of being notched at their outer edges, are notched at their inner edges as illustrated at 46, 47, 48 and 49, respectively. The members of the second pair are illustrated at 50 and 51 and have oppositely scarfed tongues 52, 53, 54 and 55 which can be assembled together through the notches 46, 47, 48 and 49 when these have been aligned by the assembly of the members 40 and 41. Outwardly of the scarfed tongues 52, 53, 54 and 55 the members 50 and 51 will provide abutting surfaces 56 which will abut against the sides of the tongues on the members 40 and 41 when the tongues 52, 53, 54 and 55 have been brought into firm mutual engagement. In the use of this joint a grid work of rectangular pattern is formed as illustrated in Fig. 4 and inasmuch as the members 50 and 51, when assembled, will lock members 40 and 41 together, adjacent crossings in the grid work may be oriented relative to each other so as to utilize this locking feature to advantage if so desired.

It will, of course, be appreciated that the type of joint illustrated in Fig. 6 can be easily altered or changed to produce a diamond type grid work by merely altering the direction of the notches 46, 47, 48 and 49 and shaping the abutting surfaces 56 correspondingly. In a similar manner the type of joint illustrated in Fig. 3 can be used where a ninety degree angle or right angle crossing is desired by similarly changing the direction of the notches 24, 25, 26 and 27 and altering the position of the abutting surfaces 22 and 23 correspondingly.

It will be appreciated from the above described construction that an improved wood joint is provided which is highly suitable in the erection of grid type structures. When the members of the first pair are assembled together the mere assembly is sufficient to enable the members to transmit across the joint bending as well as compression stresses. Likewise, when the members of the second pair are assembled together, bending as well as compression stresses can be transmitted across the joint. Furthermore, when the members of the second pair are assembled the members of the first pair are locked in position thereby. This ability to transmit stresses and the locking of the joint is not dependent upon the presence of glue or other fastening means. Consequently grid works can be erected without using any glue or fasteners whatsoever or, if glued joints are desired or required, the glue may be applied and the erection of the structure proceeded with without waiting for the glue in any joint to set.

Various changes may be made in the details of the construction without departing from the spirit and scope of the invention as defined by the appended claims.

I claim:

1. A wood joint comprising a first pair of members arranged in end-to-end relationship, each member having oppositely scarfed tongues thereon which mutually engage the oppositely scarfed tongues of the other member of the pair, notches in the sides of the tongues, and a second pair of members arranged in end-to-end relationship and at an angle to the members of the first pair, the members of the second pair each having oppositely scarfed tongues on the ends thereof which mutually engage through the notches of the scarfed tongues of the first pair, said notches having widths equal to the combined thicknesses of the tongues of said second members.

2. A wood joint comprising a pair of opposed members arranged in end-to-end relationship, said members having mutually engaging, oppositely scarfed notched tongues on the ends thereof, and a second pair of opposed members arranged in end-to-end relationship having mutually engaging, oppositely scarfed tongues on the ends thereof extending through the notches of the tongues of the first pair, the notches of said tongues having widths equal to the combined thicknesses of the tongues of said second members.

3. A wood joint comprising a first pair of opposed members arranged in end-to-end relationship, said members having mutually engaging, oppositely scarfed tongues on the ends thereof, the outside edges of the tongues being notched, and a second pair of opposed members arranged in end-to-end relationship having mutually engaging, oppositely scarfed tongues on the ends thereof extending through the notches, the notches of said tongues having widths equal to the combined thicknesses of the tongues of said second members.

4. A wood joint comprising a first pair of opposed members arranged in end-to-end relationship, said members having mutually engaging, oppositely scarfed tongues on the ends thereof, the inside edges of the tongues being notched, and a second pair of opposed members arranged in end-to-end relationship having mutually engaging, oppositely scarfed tongues on the ends thereof extending through the notches, the notches of said tongues having widths equal to the combined thicknesses of the tongues of said second members.

5. A wood joint comprising a pair of opposed members arranged in end-to-end relationship, said members having mutually engaging, oppositely scarfed notched tongues on the ends thereof, and a second pair of opposed members arranged in end-to-end relationship having mutually engaging oppositely scarfed tongues on the ends thereof extending through the notches of the tongues of the first pair and presenting at least one abutting surface on each member intermediate the ends of the tongues thereof and in abutting relationship to the sides of the tongues on the first pair, the notches of said tongues having widths equal to the combined thicknesses of the tongues of said second members.

6. A structural element comprising opposed pairs of engaged, interlocked boards each having at one end thereof a pair of oppositely scarfed tongues that are in an engaged relationship with the tongues on the opposed board, and notches traversing the tongues of one pair of boards, said notches having widths equal to the combined thicknesses of the engaged tongues extending therethrough on a second pair of boards.

7. A structural element comprising an opposed one and second pair of engaged, interlocked boards each having at one end thereof a pair of oppositely scarfed tongues that are in an engaged relationship with the tongues on the opposed board, an abutting surface intermediate the ends of said tongues on one pair of boards that engages the tongues on the second pair of boards, and notches on the second pair of boards traversing the said tongues and having widths equal to the combined thicknesses of the tongues extending therethrough on the one pair of boards.

8. A structural element comprising opposed pairs of engaged interlocked boards each having at one end thereof a pair of oppositely scarfed tongues that are in an engaged relationship with the tongues on the opposed board, and notches traversing the tongues of one pair of boards at the outer side thereof, said notches having widths equal to the combined thicknesses of the engaged tongues extending therethrough on a second pair of boards.

9. A structural element comprising opposed pairs of engaged, interlocked boards each having at one end thereof a pair of oppositely scarfed tongues that are in an engaged relationship with the tongues on the opposed board, and notches traversing the tongues of one pair of boards at the inner sides thereof and having widths equal to the combined thicknesses of the engaged tongues extending therethrough on a second pair of boards.

AXEL V. PEDERSEN.

References Cited in the file of this patent

UNITED STATES PATENTS

| Number | Name | Date |
|---|---|---|
| 971,011 | Kinnear | Sept. 20, 1910 |
| 1,165,049 | White | Dec. 21, 1915 |
| 1,225,727 | Brogden | May 8, 1917 |
| 2,159,666 | Lotz | May 23, 1939 |
| 2,171,358 | Le Gall | Dec. 24, 1939 |
| 2,478,421 | Pedersen | Aug. 9, 1949 |